US007270771B2

(12) United States Patent
Cuesta et al.

(10) Patent No.: US 7,270,771 B2
(45) Date of Patent: Sep. 18, 2007

(54) TRIAZINYLAMINOSTILBENE DISULPHONIC ACID MIXTURES

(75) Inventors: Fabienne Cuesta, Waldighoffen (FR); Georges Metzger, Moernach (FR); Roland Naef, Münchenstein (CH); Peter Rohringer, Schönenbuch (CH); Rainer Hans Traber, Reinach (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/519,031

(22) PCT Filed: Jun. 24, 2003

(86) PCT No.: PCT/EP03/50252

§ 371 (c)(1),
(2), (4) Date: Dec. 21, 2004

(87) PCT Pub. No.: WO2004/005617

PCT Pub. Date: Jan. 15, 2004

(65) Prior Publication Data

US 2006/0030707 A1 Feb. 9, 2006

(30) Foreign Application Priority Data

Jul. 5, 2002 (EP) .................................. 02405565

(51) Int. Cl.
*C07D 251/68* (2006.01)
*D06L 3/12* (2006.01)

(52) U.S. Cl. ........................... 252/301.23; 252/301.21; 544/193.2; 8/190; 8/648

(58) Field of Classification Search ............. 544/193.2; 252/300.31, 301.21, 301.23; 8/190, 648
See application file for complete search history.

(56) References Cited

U.S. PATENT DOCUMENTS

| 3,132,106 A | 5/1964 | Villaume ................. 252/301.2 |
| 3,272,805 A | 9/1966 | Häusermann et al. ....... 260/240 |
| 3,532,692 A | 10/1970 | Gold et al. ................. 260/240 |
| 3,895,009 A * | 7/1975 | Fringeli ..................... 544/113 |
| 4,946,628 A * | 8/1990 | Schussler et al. ........... 510/325 |

FOREIGN PATENT DOCUMENTS

| DE | 2715864 | 10/1977 |
| EP | 0060439 A2 * | 3/1982 |
| WO | 96/00220 | 1/1996 |
| WO | WO-98/42685 A1 * | 10/1998 |

OTHER PUBLICATIONS

Derwent Abstract 1978-09575 for JP 52152932 (1977).

* cited by examiner

*Primary Examiner*—Venkataraman Balasubramanian
(74) *Attorney, Agent, or Firm*—Joseph C. Suhadolnik

(57) ABSTRACT

The present invention relates to a fluorescent whitening agent comprising a mixture of two symmetrically and one asymmetrically substituted triazinylaminostilbene disulphonic acids, novel asymmetrically substituted derivatives, a process for their preparations and use of the mixture for whitening synthetic or natural organic materials, especially paper and for the fluorescent whitening and improvement of sun protection factors of textile materials.

18 Claims, No Drawings

TRIAZINYLAMINOSTILBENE DISULPHONIC ACID MIXTURES

The present invention relates to a fluorescent whitening agent comprising a mixture of two symmetrically and one asymmetrically substituted triazinylaminostilbene disulphonic acids, novel asymmetrically substituted derivatives, a process for their preparations and use of the mixture for whitening synthetic or natural organic materials, especially paper and for the fluorescent whitening and improvement of sun protection factors of textile materials.

Mixtures of triazinylaminostilbene sulphonic acids for whitening paper have been disclosed in U.S. Pat. No. 3,132,106. However such mixtures are restricted to the tetrasulphonic acids, which are especially suitable for whitening paper in pulp applications and less desirable for present day whitening techniques such as coating or size-press applications.

Surprisingly, it has now been found that mixtures of triazinylaminostilbene disulphonic acids are eminently suitable for use, not only in pulp applications, but also in paper coating and size-press applications, where they exhibit extremely high degrees of whiteness and, furthermore, may be readily formulated as stable liquid compositions.

Accordingly, the present invention relates to a fluorescent whitening agent, which comprises a mixture of compounds of the formulae

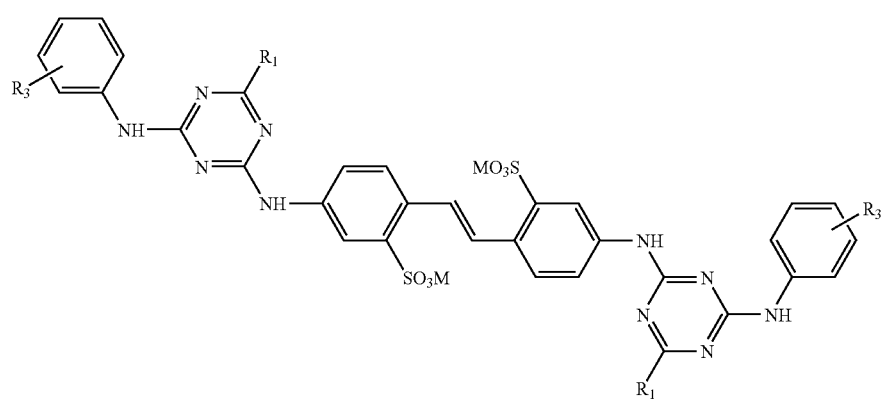

(1a)

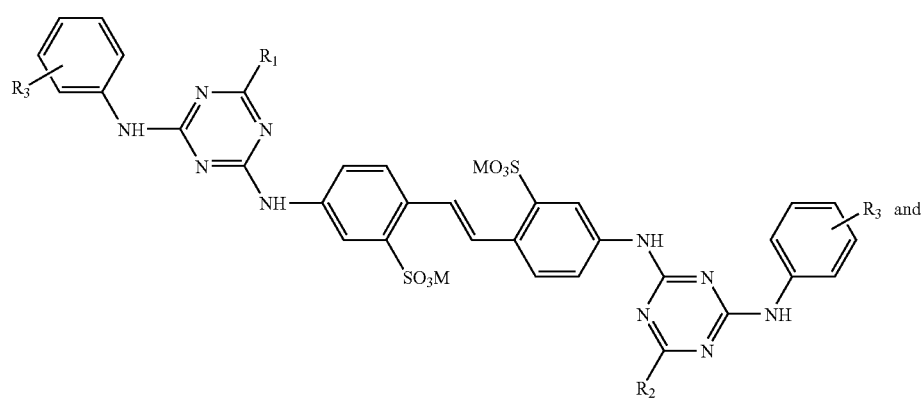

(1b)

and

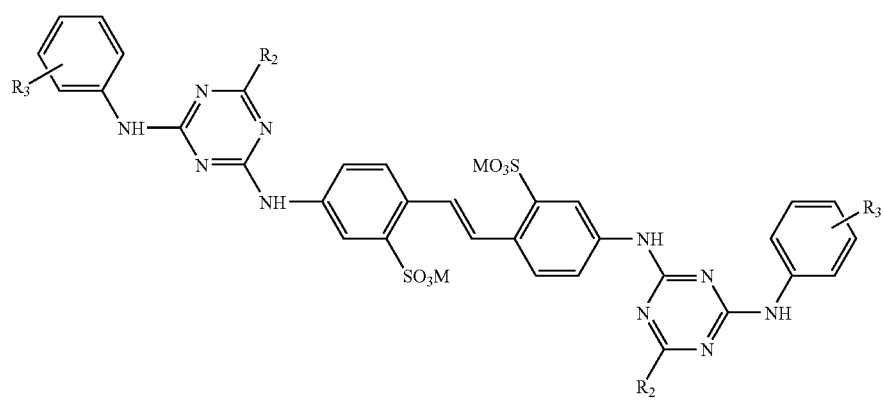

(1c)

in which $R_1$ and $R_2$ are different and each represents —$NH_2$, —$NHC_1$—$C_4$alkyl, —$N(C_1$—$C_4$alkyl$)_2$, —$NHC_2$—$C_4$hydroxyalkyl, —$N(C_2$—$C_4$hydroxyalkyl$)_2$, —$N(C_1$—$C_4$alkyl)($C_2$—$C_4$hydroxyalkyl), a morpholino, piperidino or pyrrolidino residue or an amino acid or an amino acid amide residue from which a hydrogen has been removed from the amino group, each $R_3$, independently, represents hydrogen, $C_1$—$C_4$alkyl or $C_1$—$C_4$alkoxy and M represents hydrogen, an alkali metal atom, ammonium or a cation formed from an amine, whereby $R_3$ preferably represents hydrogen.

When $R_1$ and/or $R_2$ represent an amino acid or amino acid amide residue, this is preferably of the formula

$$-NR_{4'}-CH(CO_2H)-R_4 \qquad (2)$$

or

$$-NR_4-CH_2CH_2CONH_2 \qquad (3),$$

in which each $R_4$ and $R_{4'}$, independently, represent hydrogen or a group having the formula —$CHR_5R_6$ in which $R_5$ and $R_6$, independently, are hydrogen or $C_1$-$C_4$alkyl optionally substituted by one or two substituents selected from the group consisting of hydroxy, thio, methylthio, amino, carboxy, sulfo, phenyl, 4-hydroxyphenyl, 3,5-diiodo-4-hydroxyphenyl, β-indolyl, β-imidazolyl and NH=C($NH_2$)NH—.

More preferably, the residues $R_1$ and/or $R_2$ are derived from glycine, alanine, sarcosine, serine, cysteine, phenylalanine, tyrosine (4-hydroxyphenylalanine), diiodotyrosine, tryptophan (β-indolylalanine), histidine ((β-imidazolylalanine), α-aminobutyric acid, methionine, valine (α-aminoisovaleric acid), norvaline, leucine (α-aminoisocaproic acid), isoleucine (α-amino-β-methylvaleric acid), norleucine (α-amino-n-caproic acid), arginine, ornithine (α,δ-diaminovaleric acid), lysine (α,ε-diaminocaproic acid), aspartic acid (aminosuccinic acid), glutamic acid (α-aminoglutaric acid), threonine, hydroxyglutamic acid and taurine, as well as mixtures and optical isomers thereof, or from iminodiacetic acid or from N-(propionamido)-N-(2-hydroxyethyl) amine.

Most preferably, however, $R_1$ and/or $R_2$ represent —$NHC_2$-$C_4$hydroxyalkyl, —$N(C_2$—$C_4$hydroxyalkyl$)_2$, —$N(C_1$—$C_4$alkyl)($C_2$-$C_4$hydroxyalkyl), a morpholino residue or a residue derived from glycine, sarcosine, taurine, glutamic acid, aspartic acid or iminodiacetic acid and, especially, $R_1$ and $R_2$ represent a mono-(2-hydroxyethyl) amino, a di-(2-hydroxyethyl)amino, a di-(2-hydroxypropyl) amino, an N-(2-hydroxyethyl)-N-methylamino, an aspartic acid, an iminodiacetic acid or a morpholino residue.

In the compounds of formulae (1a)-(1c), M represents hydrogen, lithium, potassium, sodium, ammonium, mono-, di-, tri- or tetra-$C_1$-$C_4$alkylammonium, mono-, di- or tri-$C_1$—$C_4$hydroxyalkylammonium or ammonium that is di- or tri-substituted with a mixture of $C_1$-$C_4$alkyl and $C_1$-$C_4$hydroxyalkyl groups, i.e. $H_2N^+(C_1$-$C_4$alkyl)($C_1$-$C_4$hydroxyalkyl) and $HN^+(C_1$-$C_4$alkyl$)_m$($C_1$-$C_4$hydroxyalkyl$)_n$, where n and m represent 1 or 2, but preferably M represents hydrogen, potassium or sodium.

In a most preferred aspect, the invention relates to a fluorescent whitening agent comprising a mixture of the compounds of formulae (1a), (1b) and (1c) in which $R_1$ represents mono-(2-hydroxyethyl) amino or di-(2-hydroxyethyl)amino $R_2$ represents di-(2-hydroxyethyl)amino, di-(2-hydroxypropyl)amino, an aspartic acid or iminodiacetic acid residue, whereby $R_1$ and $R_2$ are different, $R_3$ represents hydrogen and M represents sodium.

Where $R_1$, $R_2$ and/or $R_3$ contain $C_1$-$C_4$alkyl radicals, these may be branched or unbranched and are, for example, methyl, ethyl, n-propyl, isopropyl or n-butyl; isobutyl or tert.-butyl, whilst $C_1$-$C_4$alkoxy is, for example, methoxy, ethoxy, propoxy, isopropoxy, n-butoxy, isobutoxy or tert-butoxy. $C_1$-$C_4$hydroxyalkyl may, for example, be hydroxymethyl, hydroxyethyl, hydroxypropyl or hydroxybutyl.

The compound mixture of formulae (1a), (1b) and (1c) may be prepared by reacting, under known reaction conditions, cyanuric chloride, successively, in any desired sequence, with each of 4,4'-diaminostilbene-2,2'-disulphonic acid, aniline or a derivative thereof, an amino compound $R_1H$ and an amino compound $R_2H$, or, alternatively a mixture of amino compounds $R_1H$ and $R_2H$, $R_1$ and $R_2$ being as defined previously. However, preferably, cyanuric chloride is initially reacted with 4,4'-diaminostilbene-2,2'-disulphonic acid, followed by reaction with aniline or alkyl or alkoxy derivatives thereof and, finally, with a mixture of amino compounds $R_1H$ and $R_2H$.

Depending on the amounts and proportions of the amines $R_1H$ and $R_2H$ and whether they are added sequentially or simultaneously as a mixture, the proportions of the compounds (1a), (1b) and (1c) can be varied considerably. Thus, the present invention relates to a fluorescent whitening agent which comprises a mixture of the compounds (1a), (1b) and (1c) wherein each of the components are present in a molar ratio of between 5 and 80%, preferably they are present in the approximate molar ratios of 5-45% of the compound of formula (1a), 15-60% of the compound of formula (1b) and 5-45% of the compound of formula (1c). More preferably, the compounds (1a), (1b) and (1c) are present in the approximate molar ratios of 20-50% of the compound of formula (1a), 25-50% of the compound of formula (1b) and 5-35% of the compound of formula (1c).

Naturally, such compositions may also be obtained simply by mechanical mixing of the individual components in the desired proportions. In this case it is necessary to obtain the individual components as pure substances. Whilst the components of formulae (1a) and (1c) are known compounds or may be prepared by known methods, compounds of formula (1b) are new. Consequently, a further aspect of the invention is a compound of formula

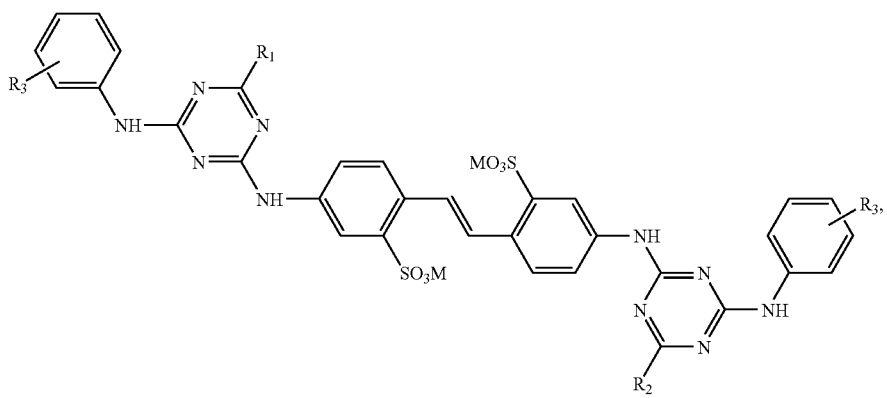

(1b)

in which
R₁, R₂, R₃ and M are as defined previously.

The compound of formula (1b) may either be obtained by purification of the mixture obtained as described above, or, for example, by the following reaction sequence:
i) Reaction of cyanuric chloride with 4-amino-4'-nitrostilbene-2,2'-disulphonic acid with cyanuric chloride;
ii) reaction of the dichloro intermediate with aniline or an aniline derivative;
iii) reaction of the monochloro intermediate with an amine $R_1H$ or $R_2H$;
iv) reduction of the nitrostilbene to the aminostilbene;
v) reaction with cyanuric chloride;
vi) reaction of the dichloro intermediate with aniline or an aniline derivative and
vii) reaction of the monochloro intermediate with an amine $R_2H$ or $R_1H$.

Naturally, this reaction sequence may be performed in any desirable and practical order.

A further aspect of the invention is the use of a composition for whitening synthetic or natural organic materials, which contains water, a fluorescent whitening agent which comprises a mixture of the compounds (1a), (1b) and (1c) and, optionally, auxiliaries.

More specifically, such brightener compositions contain water and, in each case based on the weight of the formulation, from 3 to 25% by weight, preferably from 5 to 15% by weight of the above defined fluorescent whitening agent mixture and also 0 to 60%, preferably 5 to 50% by weight, of auxiliaries.

Suitable auxiliaries include, for example, anionic or non-ionic dispersants from the class of ethylene oxide adducts with fatty alcohols, higher fatty acids or alkyl phenols or ethylenediamine ethylene oxide-propylene oxide adducts, copolymers of N-vinylpyrrolidone with 3-vinylpropionic acid, water retention aids, such as ethylene glycol, glycerol or sorbitol, or biocides.

Further auxiliaries useful both for the production of stable liquid formulations and also for enhancing the whitening effect of the mixtures are, for example, polyethylene glycols. Such polyethylene glycols may have average molecular weights varying over a wide range, for example from about 200 to about 2000, the molecular weight range of about 1500 being especially suitable.

Most of the compositions comprising a mixture of the compounds of formulae (1a), (1b) and (1c) are excellent fluorescent whitening agents for substrates such as textiles, for the addition to detergent compositions and, especially for the fluorescent whitening of paper.

When used for the fluorescent whitening of paper, the composition, which contains water, a fluorescent whitening agent which comprises a mixture of the compounds (1a), (1b) and (1c) and, optionally, auxiliaries, may be applied to the paper substrate in the pulp mass, in the form of a paper coating composition, or directly in the size press or metering press.

In one preferred aspect, the present invention provides a method for the fluorescent whitening of a paper surface, comprising contacting the paper surface with a coating composition comprising a white pigment, a binder dispersion; optionally a water-soluble co-binder; and sufficient of a fluorescent whitening agent comprising a mixture of the compounds of formulae (1a), (1b) and (1c) according to the present invention, to ensure that the treated paper contains 0.01 to 1% by weight, based on the white pigment, a fluorescent whitening agent.

As the white pigment component of the paper coating composition used according to the method of the present invention, there are preferred inorganic pigments, e.g., aluminium or magnesium silicates, such as China clay and kaolin and, further, barium sulfate, satin white, titanium dioxide, calcium carbonate (chalk) or talcum; as well as white organic pigments.

The paper coating compositions used according to the method of the present invention may contain, as binder, inter alia, plastics dispersions based on copolymers of butadiene/styrene, acrylonitrile/butadiene/styrene, acrylic acid esters, acrylic acid esters/styrene/acrylonitrile, ethylene/vinyl chloride and ethylene/vinyl acetate; or homopolymers, such as polyvinyl chloride, polyvinylidene chloride, polyethylene and polyvinyl acetate or polyurethanes. A preferred binder consists of styrene/butyl acrylate or styrene/butadiene/acrylic acid copolymers or styrene/butadiene rubbers. Other polymer lattices are described, for example, in U.S. Pat. Nos. 3,265,654, 3,657,174, 3,547,899 and 3,240,740.

The optional water-soluble protective colloid may be, e.g., soya protein, casein, carboxymethylcellulose, natural or modified starch, chitosan or a derivative thereof or, especially, polyvinyl alcohol. The preferred polyvinyl alcohol protective colloid component may have a wide range of saponification levels and molecular weights; e.g. a saponification level ranging from 40 to 100; and an average molecular weight ranging from 10,000 to 100,000.

Recipes for coating compositions for paper are described, for example, in J. P. Casey "Pulp and Paper"; Chemistry and Chemical Technology, 2nd edition, Volume III, pages 1684-1649 and in "Pulp and Paper Manufacture", 2nd and 5th edition, Volume II, page 497 (McGraw-Hill).

The paper coating compositions used according to the method of the present invention preferably contain 10 to 70% by weight of a white pigment. The binder is preferably used in an amount, which is sufficient to make the dry content of polymeric compound up to 1 to 30%, by weight, preferably 5 to 25% by weight, of the white pigment. The amount of fluorescent brightener preparation used according to the invention is calculated so that the fluorescent brightener is preferably present in amounts of 0.01 to 1% by weight, more preferably 0.05 to 1% by weight, and especially 0.05 to 0.6% by weight, based on the white pigment.

The paper coating composition used in the method according to the invention can be prepared by mixing the components in any desired sequence at temperature from 10 to 100° C., preferably 20 to 80° C. The components here also include the customary auxiliaries, which can be added to regulate the rheological properties, such as viscosity or water retention capacity, of the coating compositions. Such auxiliaries are, for example, natural binders, such as starch, casein, protein or gelatin, cellulose ethers, such as carboxyalkylcellulose or hydroxyalkylcellulose, alginic acid, alginates, polyethylene oxide or polyethylene oxide alkyl ethers, copolymers of ethylene oxide and propylene oxide, polyvinyl alcohol, water-soluble condensation products of formaldehyde with urea or melamine, polyphosphates or polyacrylic acid salts.

The coating composition used according to the method of the present invention is preferably used to produce coated printed or writing paper, or special papers such as ink-jet or photographic papers, or cardboard.

The coating composition used according to the method of the invention can be applied to the substrate by any conventional process, for example with an air blade, a coating blade, a roller, a doctor blade or a rod, or in the size press, after which the coatings are dried at paper surface temperatures in the range from 70 to 200° C., preferably 90 to 130° C., to a residual moisture content of 3-8%, for example with infra-red driers and/or hot-air driers. Comparably high degrees of whiteness are thus achieved even at low drying temperatures.

By the use of the method according to the invention, the coatings obtained are distinguished by optimum distribution of the dispersion fluorescent brightener over the entire surface and by an increase in the level of whiteness thereby achieved, by a high fastness to light and to elevated temperature (e.g. stability for 24 hours at 60-100° C.) and excellent bleed-fastness to water.

In a second preferred aspect, the present invention provides a method for the fluorescent whitening of a paper surface comprising contacting the paper in the size press with an aqueous solution containing a size, optionally an inorganic or organic pigment and 0.1 to 20 g/l of a fluorescent whitening agent comprising a mixture of the compounds of formulae (1a), (1b) and (1c) according to the present invention. Preferably, the size is starch, a starch derivative or a synthetic sizing agent, especially a water-soluble copolymer.

In one further aspect of the invention, the mixture of the compounds of formulae (1a), (1b) and (1c) provide a method for increasing the SPF (Sun Protection Factor) rating or for the fluorescent whitening of a textile fibre material, comprising treating the textile fibre material with 0.05 to 5.0% by weight, based on the weight of the textile fibre material, with one or more mixtures of the compounds of formulae (1a), (1b) and (1c) of the invention, as previously defined.

Textile fibres treated according to the method of the present invention may be natural or synthetic fibres or mixtures thereof. Examples of natural fibres include vegetable fibres such as cotton, viscose, flax, rayon or linen, preferably cotton and animal fibres such as wool, mohair, cashmere, angora and silk, preferably wool. Synthetic fibres include polyester, polyamide and polyacrylonitrile fibres. Preferred textile fibres are cotton, polyamide and wool fibres.

Preferably, textile fibres treated according to the method of the present invention have a density of less than 200 g/m$^2$ and have not been previously dyed in deep shades.

Some of the mixture of the compounds of formulae (1a), (1b) and (1c) used in the method of the present invention may be only sparingly soluble in water and may need to be applied in dispersed form. For this purpose, they may be milled with an appropriate dispersant, conveniently using quartz balls and an impeller, down to a particle size of 1-2 microns.

As dispersing agents for such sparingly-soluble mixture of the compounds of formulae (1a), (1b) and (1c) there may be mentioned:

acid esters or their salts of alkylene oxide adducts, e.g., acid esters or their salts of a polyadduct of 4 to 40 moles of ethylene oxide with 1 mole of a phenol, or phosphoric acid esters of the adduct of 6 to 30 moles of ethylene oxide with 1 mole of 4-nonylphenol, 1 mole of dinonylphenol or, especially, with 1 mole of compounds which have been produced by the addition of 1 to 3 moles of styrenes on to 1 mole of phenol;

polystyrene sulphonates;

fatty acid taurides;

alkylated diphenyloxide-mono- or -di-sulphonates;

sulphonates of polycarboxylic acid esters;

addition products of 1 to 60, preferably 2 to 30 moles of ethylene oxide and/or propylene oxide on to fatty amines, fatty amides, fatty acids or fatty alcohols, each having 8 to 22 carbon atoms, or on to tri- to hexavalent $C_3$-$C_6$alkanols, the addition products having been converted into an acid ester with an organic dicarboxylic acid or with an inorganic polybasic acid;

lignin sulphonates and, in particular, formaldehyde condensation products, e.g., condensation products of lignin sulphonates and/or phenol and formaldehyde; condensation products of formaldehyde with aromatic sulphonic acids, e.g., condensation products of ditolylethersulphonates and formaldehyde; condensation products of naphthalenesulphonic acid and/or naphthylaminesulphonic acids and formaldehyde; condensation products of phenolsulphonic acids and/or sulphonated dihydroxydiphenylsulphone and phenols and cresols with formaldehyde and/or urea; or condensation products of diphenyloxide-disulphonic acid derivatives with formaldehyde.

Depending on the type of mixture of the compounds of formulae (1a), (1b) and (1c), it may be beneficial to carry out the treatment in a neutral, alkaline or acidic bath. The method is usually conducted in the temperature range of from 20 to 140° C., for example, at or near the boiling point of the aqueous bath, e.g., at about 90° C.

Solutions of the mixture of the compounds of formulae (1a), (1b) and (1c) or their emulsions in organic solvents may also be used in the method of the present invention. For example, the so-called solvent dyeing (pad thermofix application) or exhaust dyeing methods in dyeing machines may be used.

If the method of the present invention is combined with a textile treatment or finishing method, such combined treatment may be advantageously carried out using appropriate stable preparations which contain the mixture of the compounds of formulae (1a), (1b) and (1c) in a concentration such that the desired SPF improvement or degree of whiteness is achieved.

In certain cases, the mixture of the compounds of formulae (1a), (1b) and (1c) is made fully effective by an aftertreatment. This may comprise a chemical treatment such as treatment with an acid, a thermal treatment or a combined thermal/chemical treatment.

It is often advantageous to use the mixture of the compounds of formulae (1a), (1b) and (1c) in admixture with an assistant or extender such as sodium sulphate, sodium sulphate decahydrate, sodium chloride, sodium carbonate, an alkali metal phosphate such as sodium or potassium orthophosphate, sodium or potassium pyrophosphate or sodium or potassium tripolyphosphate, or an alkali metal silicate such as sodium silicate.

In addition to the mixture of the compounds of formulae (1a), (1b) and (1c), a minor proportion of one or more adjuvants may also be employed in the method of the present invention. Examples of adjuvants include emulsifiers, perfumes, bleaching agents, enzymes, colouring dyes, opacifiers, further optical whitening agents, bactericides, nonionic surfactants, fabric care ingredients, anti-gelling agents such as nitrites or nitrates, especially sodium nitrate, and corrosion inhibitors such as sodium silicate.

The amount of each of these optional adjuvants should not exceed 1%, and preferably ranges from 0.01 to 1% by weight on the treated fibre.

The method of the present invention, in addition to providing protection to the skin, also increases the useful life of a textile article treated according to the present invention. In particular, the tear resistance and/or light fastness of the treated textile fibre material may be improved.

The present invention also provides a textile fabric produced from a fibre treated according to a method of the present invention as well as an article of clothing produced from the said fabric.

Such textile fabrics and articles of clothing produced from the said fabrics typically have an SPF rating of 20 and above, whereas untreated cotton, for example, generally has an SPF rating of from 2 to 4.

The fluorescent whitening agents of the present invention are particularly advantageous in that they exhibit not only extremely high whitening ability, excellent substantivity and fastness properties, but, in addition, in many cases highly desirable water solubilities, thus enabling ready preparation of stable concentrated liquid formulations.

The following Examples serve to illustrate the invention without intending to be restrictive in nature; parts and percentages are by weight, unless otherwise stated.

PREPARATIVE EXAMPLES

Example 1

11.0 g of 4,4'-bis[(4-anilino-6-chloro-1,3,5-triazin-2-yl)amino]stilbene-2,2'-disulphonic acid disodium salt are stirred in 120 ml of water. To the resulting suspension, 1.64 g of diethanolamine and 2.07 g of di-isopropanolamine are added. The mixture is then heated to 95° C. and stirred for 3 hours at this temperature, the pH being maintained at 8.0-8.5 by addition of a total of 3.0 g of 32% aqueous sodium hydroxide solution. The mixture is then cooled during which time two phases separate. The lower phase is separated off, diluted with 50 ml of acetone and acidified to pH 4-5 by addition of 4N aqueous hydrochloric acid. The precipitated solids are filtered and washed with water. The filter-cake is stirred in water and the pH adjusted to 10 by addition of 2N aqueous sodium hydroxide solution, when a clear solution results. The water is evaporated off and the residue dried under vacuum at 80° C. to yield the fluorescent whitening agent (101), which comprises a mixture containing 41% of the compound (101a), 26% of compound (101b) and 24% compound (101c), in addition to 4.5% water and 0.5% sodium chloride.

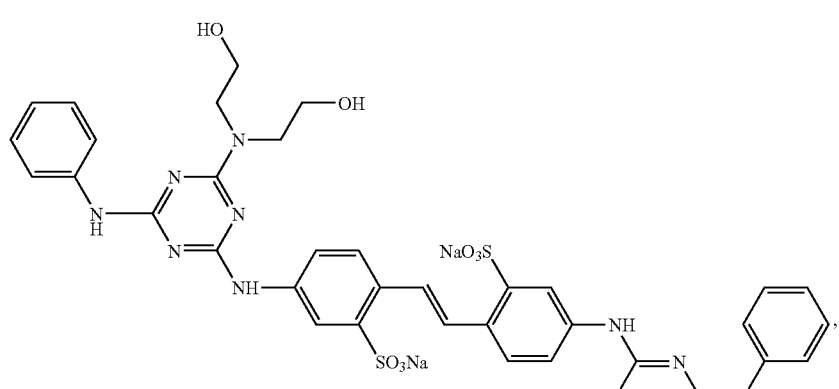
(101a)
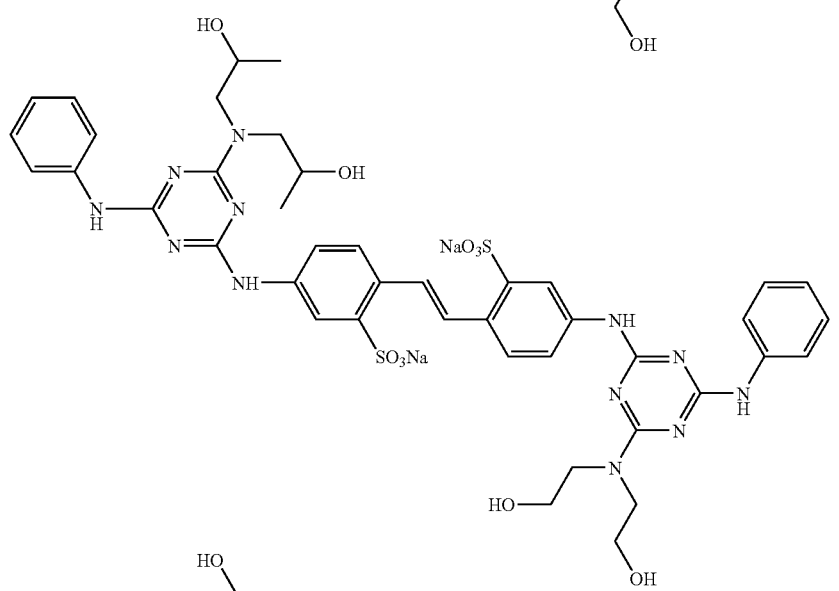
(101b)
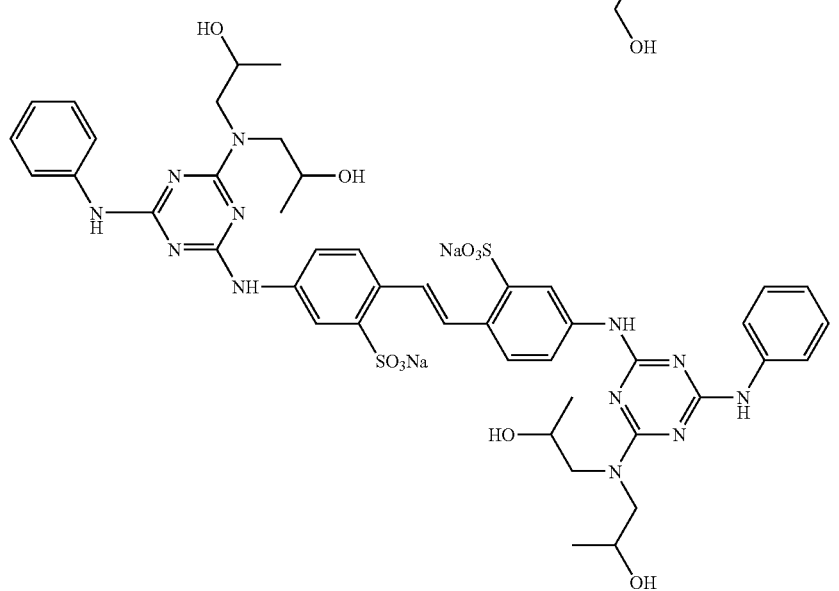
(101c)

Example 2

By proceeding as described in Example 1, but employing 1.76 g of diethanolamine and 1.60 g of di-isopropanolamine, the fluorescent whitening agent (102) is obtained, which comprises a mixture containing 42% of compound (101a), 44.5% of compound (101b) and 6.5% of compound (101c), together with 2% water and 0.07% sodium chloride.

Example 3

By proceeding as described in Example 2, but by working up the entire reaction mass, instead of phase separation, by acidification with 4N hydrochloric acid to pH 4, addition of 50 ml of acetone, filtering the solids, dissolution in water and 32% aqueous sodium hydroxide solution, evaporation of the water and drying the product at 80° C. under vacuum, a fluorescent whitening agent (103) is obtained, which comprises a mixture containing 32.5% of compound (101a), 44.5% of compound (101b) and 14.5% of compound (101c), together with 3.5% water and 0.03% sodium chloride.

Example 4

15.0 g of 4,4'-bis[(4anilino-6-chloro-1,3,5-triazin-2-yl)amino]stilbene-2,2'-disulphonic acid disodium salt are suspended in 14.0 g of polyethylene glycol 300 and 29.6 g of water. To the stirred suspension are then added 2.15 g of aspartic acid, 1.7 g of diethanolamine and 1.2 g of 50% aqueous sodium hydroxide solution. The reaction mixture is heated to 90° C. and stirring continued at this temperature for 7 hours, the pH being maintained at 8.5-9.3 by addition of 32% aqueous sodium hydroxide solution. The reaction mixture is cooled and filtered to yield a liquid formulation containing 24.6% of the fluorescent whitening agent (104), which comprises a mixture containing 39% of compound (101a), 22% of compound (104b) and 33% of compound (104c).

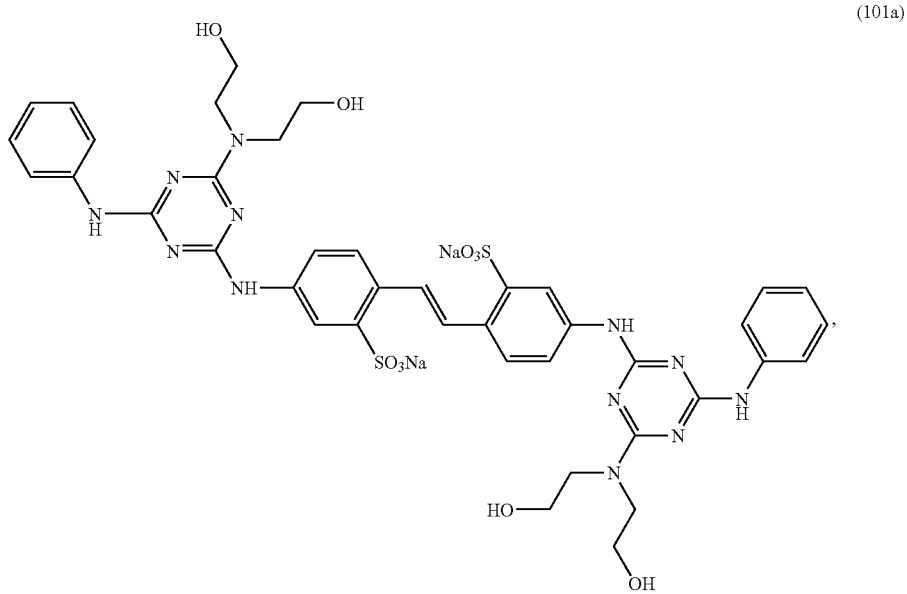

(101a)

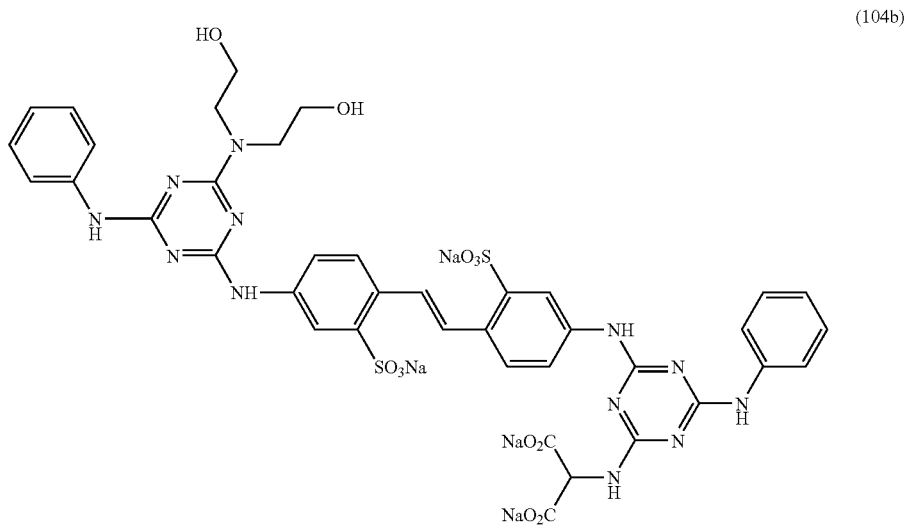

(104b)

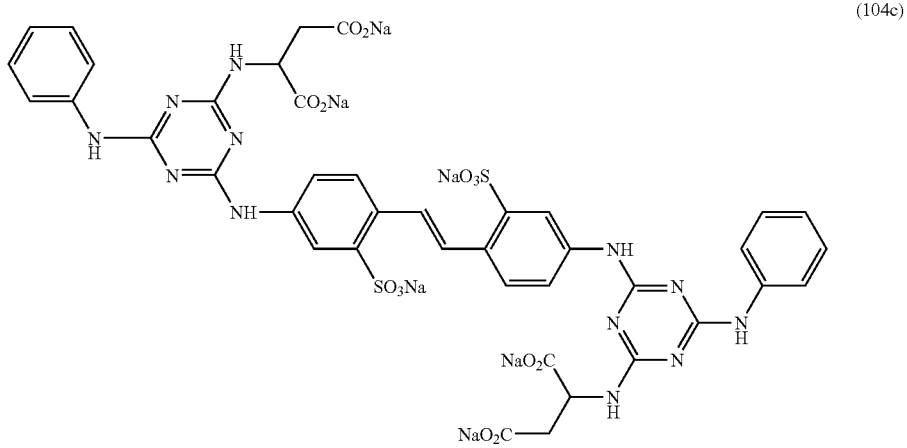

(104c)

Example 5

30.0 g of 4,4'-bis[(4-anilino-6-chloro-1,3,5-triazin-2-yl)amino]stilbene-2,2'-disulphonic acid disodium salt are suspended in 28.0 g of polyethylene glycol 300 and 58.0 g of water. To the stirred suspension are then added 4.269 of iminodiacetic acid and 3.37 g of diethanolamine. The reaction mixture is heated to 95° C. and stirring continued at this temperature for 7 hours, the pH being initially adjusted to 8.5-9.0 by addition of 5.07 g of 50% aqueous sodium hydroxide solution and maintained at this value by addition of 7.8 g of 32% aqueous sodium hydroxide solution. The reaction mixture is cooled and filtered to yield a liquid formulation containing 25% of the fluorescent whitening agent (105), which comprises a mixture of 28% of compound (101a), 44% of compound (105b) and 26% of compound (105c).

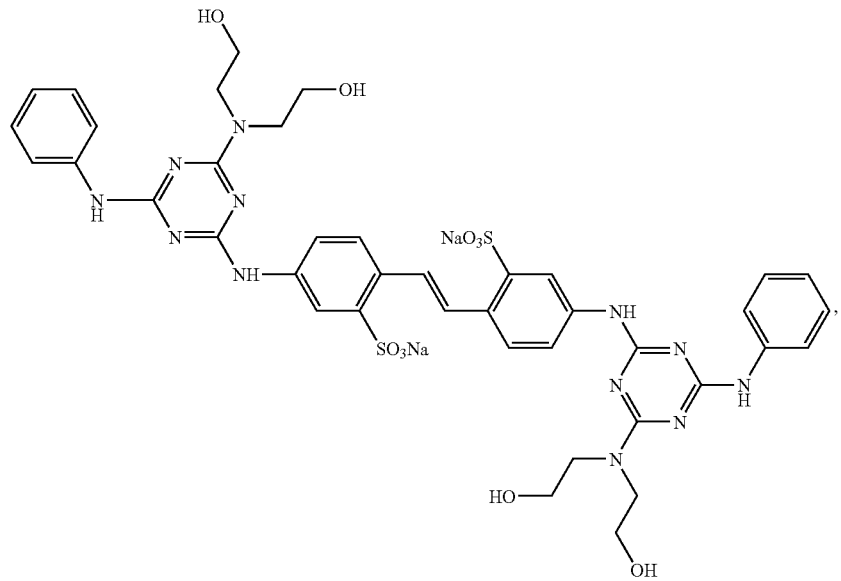

(101a)

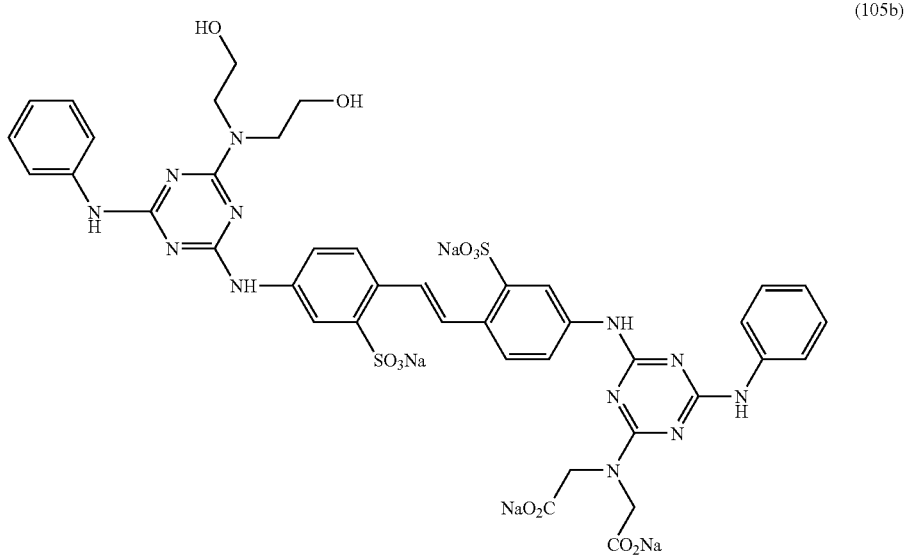

(105b)

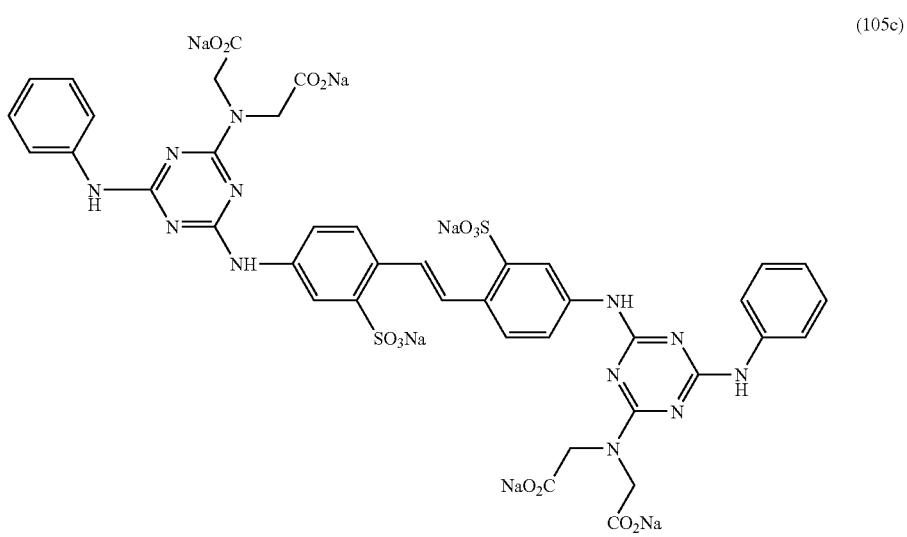

(105c)

Example 6

16.3 g of 4,4'-bis[(4-anilino-6-chloro-1,3,5-triazin-2-yl)amino]stilbene-2,2'-disulphonic acid disodium salt (91.7%), 1.15 g of monoethanolamine and 1.96 g of diethanolamine are suspended in 50 ml of water. The mixture is heated to 95-100° C. and stirring continued for 5 hours at this temperature, the pH being maintained at between 8.6 and 8.9 by the addition of 32% aqueous sodium hydroxide solution. After cooling to room temperature, the reaction mixture is poured into 500 ml of acetone and the pH adjusted to 2-3 by addition of 6N hydrochloric acid. The yellow suspension is filtered, washed salt-free with water and the resulting solids dried under vacuum at 80° C. There are obtained 14.7 g of the fluorescent whitening agent (106), which comprises a mixture containing 20% of compound (101a), 45% of compound (106b) and 35% of compound (106c).

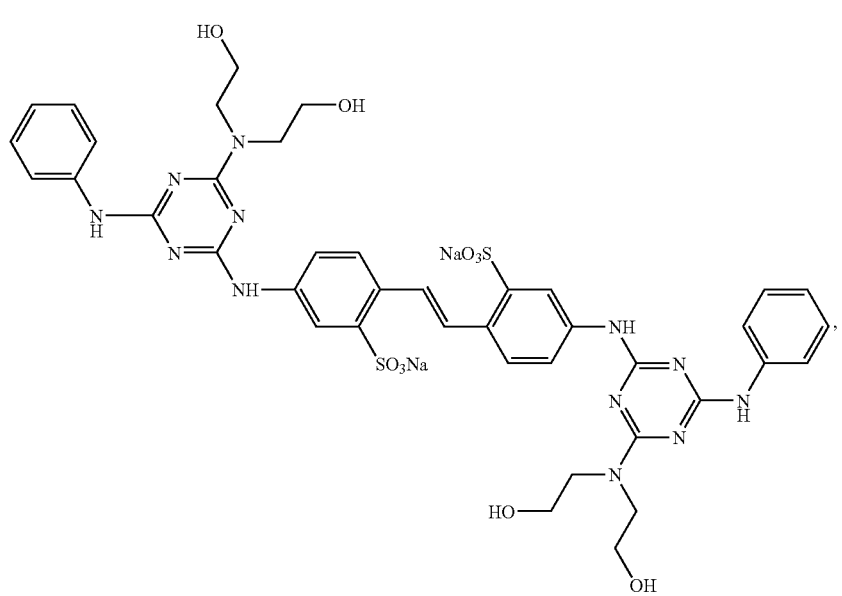
(101a)
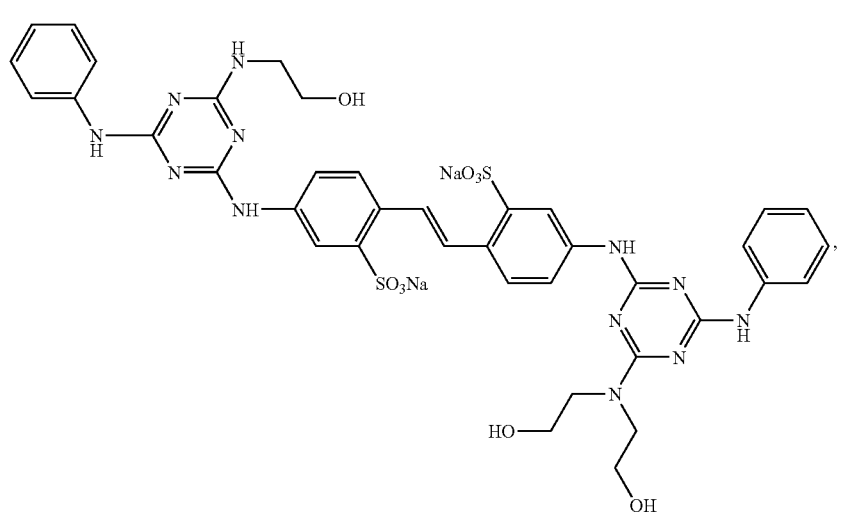
(106b)
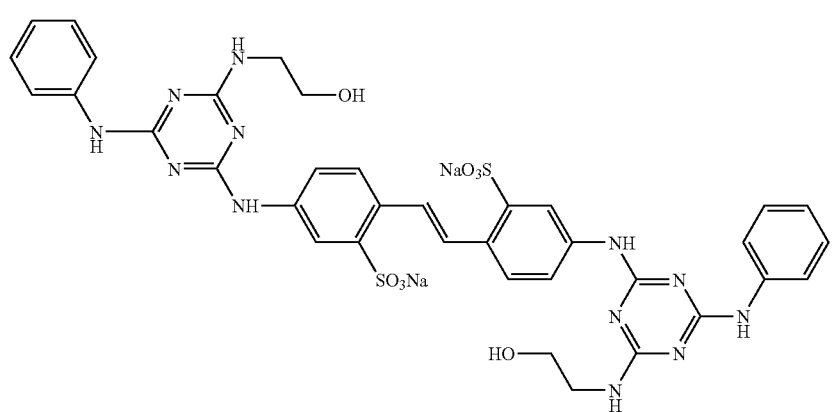
(106c)

Example 7
By proceeding as described in Example 6, but replacing the 1.96 g of diethanolamine by 2.51 g of di-isopropanolamine, there are obtained 17.3 g of the fluorescent whitening agent (107), which comprises a mixture containing 22% of compound (101c), 44% of compound (107b) and 34% of compound (106c).
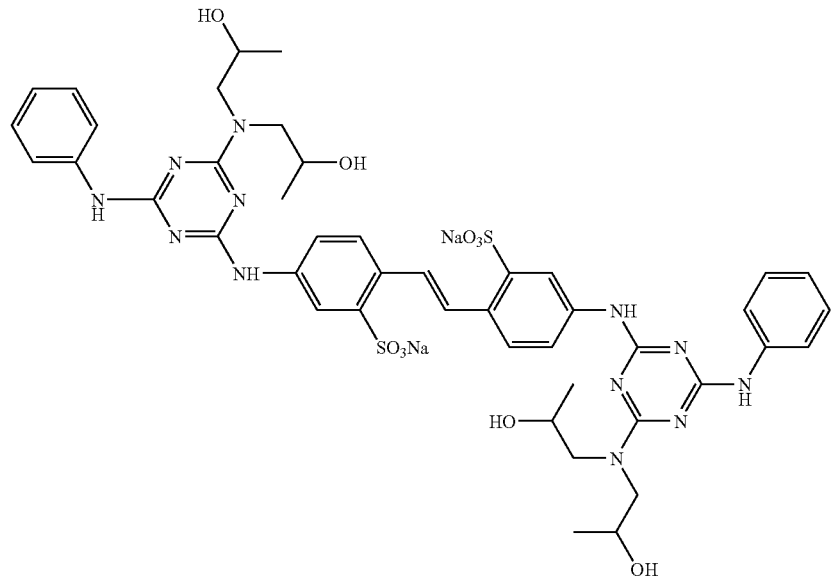
(101c)
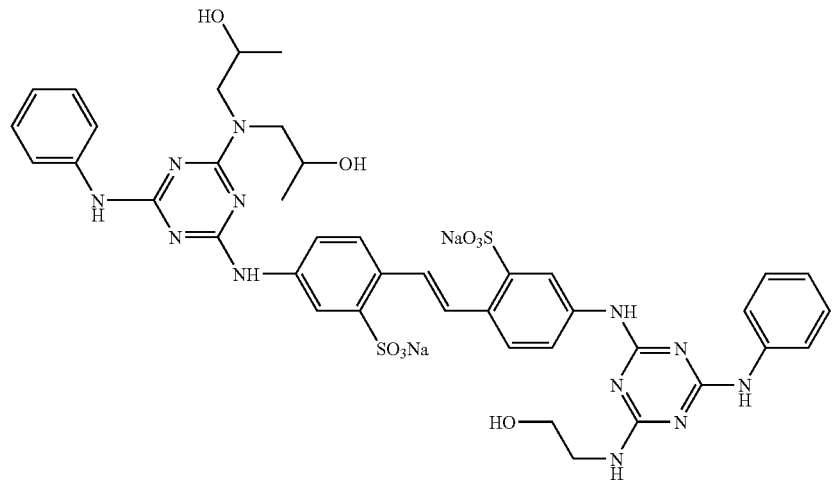
(107b)
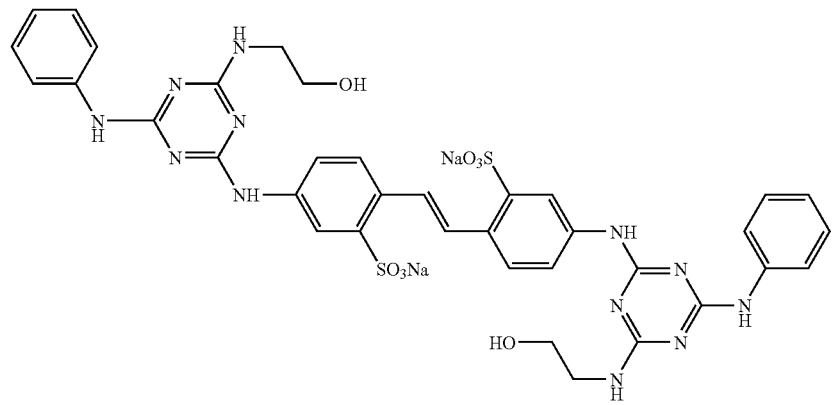
(106c)

Example 8

Synthesis of Compound (104b)

Step 1

To a stirred suspension of 9.8 g of cyanuric chloride in 100 g of ice-water and 50 ml of acetone is added a mixture of 25 g of 84.9% 4-amino-4'-nitrostilbene-2,2'-disulphonic acid. After the addition, stirring is continued for 40 minutes at 5° C., the pH being maintained at 4.0-4.5 by addition of a total amount of approximately 60 ml of 1M aqueous sodium carbonate solution. After this time, 4.93 g of aniline are added and the mixture heated to 50° C., the pH being maintained at 6.5-7.0 by addition of a total amount of 28 ml of 1M aqueous sodium carbonate solution. To the resulting suspension, 7.25 g of diethanolamine in 30 ml of water are added and the temperature raised to 95° C., the acetone being distilled off and the pH being maintained at 7.5-8.0 by addition of a total amount of approximately 20 ml of 1M aqueous sodium carbonate solution. After cooling, the pH is adjusted to 3.0 by addition of 6N aqueous hydrochloric acid solution and the precipitated solids filtered and dried under vacuum at 80° C. to yield 4-[(4-anilino-6-diethanolamino-1,3,5-triazin-2-yl)amino]-4'-nitrostilbene-2,2'-disulphonic acid.

Step 2

0.02 Moles of 4-[(4-anilino-6-diethanolamino-1,3,5-triazin-2-yl)amino]-4'-nitrostilbene-2,2'-disulphonic acid are reduced with 0.3 moles of iron filings and 11 g of glacial acetic acid in 400 ml of water, according to the Béchamp method, to yield 4-[(4-anilino-6-diethanolamino-1,3,5-triazin-2-yl)amino]-4'-aminostilbene-2,2'-disulphonic acid.

Step 3

To a stirred suspension of 3.6 g of cyanuric chloride in 50 ml of methyl ethyl ketone and 50 g of ice, a solution of 13.3 g of 86% 4-[(4-anilino-6-diethanolamino-1,3,5-triazin-2-yl)amino]-4'-aminostilbene-2,2'-disulphonic acid in 160 g of ice-water over 30 minutes. The temperature is raised to 10° C. over a period of 1 hour, the pH being maintained at 6.0-6.5 by addition of a total amount of approximately 4 ml of 1M aqueous sodium carbonate solution. To the resulting suspension, 1.7 g of aniline are added and the temperature raised to 30° C. After stirring for 1 hour, during which time the pH is maintained at 6.5-7.0 by addition of 1M aqueous sodium carbonate solution, a further 0.33 g of aniline are added and stirring continued for a further 1 hour at 30° C. The mixture is then cooled and acidified and the product filtered to yield 4-[(4-anilino-6-diethanolamino-1,3,5-triazin-2-yl)amino]-4'-[(4-anilino-6-chloro-1,3,5-trizin-2-yl)amino]stilbene-2,2'-disulphonic acid.

Step 4 2 g of 4-[(4-anilino-6-diethanolamino-1,3,5-triazin-2-yl)amino]-4'-[(4-anilino-6-chloro-1,3,5-trizin-2-yl)amino]stilbene-2,2'-disulphonic acid are reacted with 0.6 g of aspartic acid in 25 ml of water at 95° C. over 4 hours, during which time the pH is maintained at 8.0-8.5 by addition of a total of 1.1 g of 32% aqueous sodium hydroxide solution. The product is precipitated by addition of a mixture of ethanol and isopropanol to the reaction solution, filtered and dried to yield compound (104b).

APPLICATION EXAMPLES

Pulp Mass Application

Examples 9-11

To a fibre dispersion containing 2 g of a mixture of 50% bleached beech and 50% bleached pine fibres of 35° SR (Schopper-Riegler) in water of 10° German hardness are added 10% of calcium carbonate filler. 0.2% of the appropriate fluorescent whitening agent, calculated as 100% active substance, are then added as an aqueous solution. After stirring for 15 minutes, 0.03% of a cationic polyacrylamide retention agent is added and handsheets formed using the Rapid-Koethen system. After drying, the CIE Whiteness and ISO Fluorescence of the sheets are recorded. The results are summarized in Table 1 below.

TABLE 1

| Example N | FWA | CIE Whiteness | ISO Fluorescence |
|---|---|---|---|
| 9 | (101) | 129 | 19.4 |
| 10 | (102) | 131 | 20.2 |
| 11 | (103) | 130 | 20.3 |

Coating Application

Example 12

To a coating colour having a solids content of 62% and consisting of 60% calcium carbonate and 40% clay, 0.2 parts of polyvinyl alcohol and 9 parts of SBR binder, based on the weight of the pigment, are added followed by 0.2 parts of the fluorescent whitening agent (103) of Example 3. After stirring for 15 minutes to homogenize the coating colour, a base paper free of fluorescent whitening agent is coated using a laboratory blade coater with a coating speed of 50m/min. such that a coat weight of 12 g/m$^2$ results. After drying, the CIE Whiteness and Iso-fluorescence values are measured.

CIE Whiteness 95.4
Iso-fluorescence 7

Water Solubility

By producing saturated solutions of the appropriate fluorescent whitening agents, the water solubilities are determined, the values being summarised in Table 2 below.

TABLE 2

| Fluorescent Whitening Agent | Water Solubility |
|---|---|
| (101a) | 3–3.5% |
| (101) | 9% |
| (102) | 12% |
| (103) | 7% |

The results clearly demonstrate the superior water solubility of the mixtures of the invention in comparison to one single component.

The invention claimed is:

1. A fluorescent whitening agent which is a composition comprising a mixture of two symmetrical compounds (1a) and (1c) and one asymmetrical compound 1(b) of the formulae

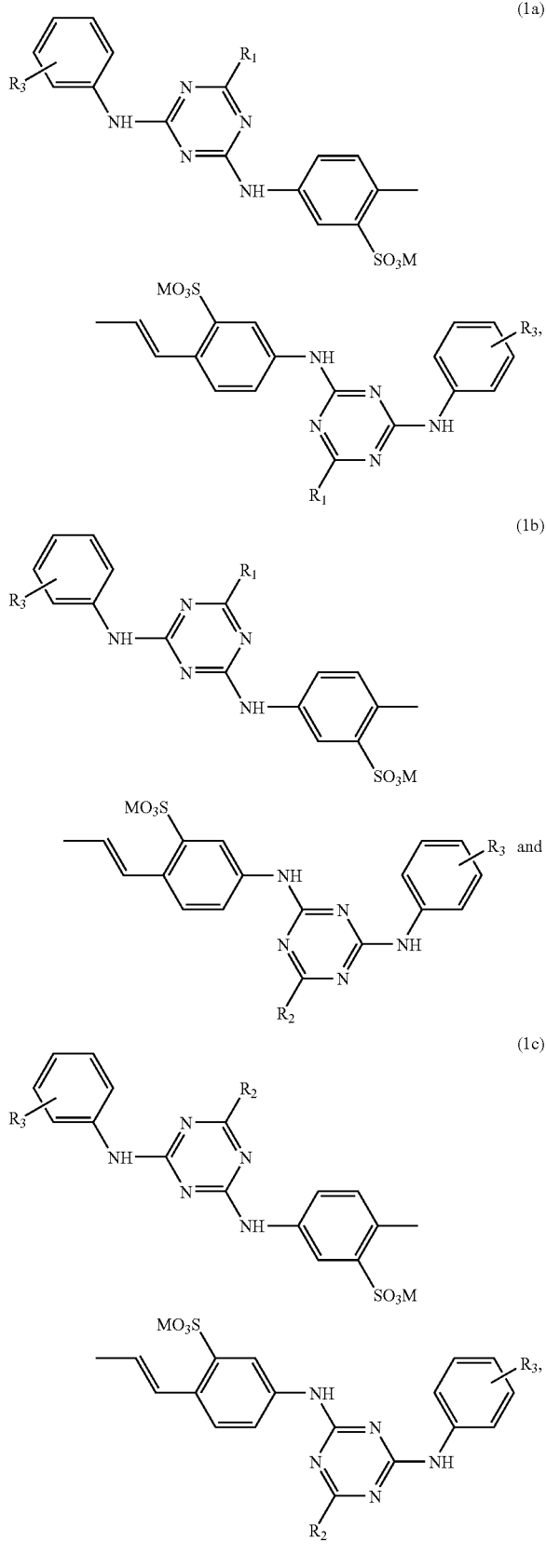

in which $R_1$ and $R_2$ are different and $R_1$ represents —$NH_2$, —$NHC_1$-$C_4$alkyl, —$N(C_1$-$C_4$alkyl)$_2$, —$NHC_2$-$C_4$ hydroxyalkyl, —$N(C_2$-$C_4$hydroxyalkyl)$_2$, —$N(C_1$-$C_4$alkyl)($C_2$-$C_4$hydroxyalkyl), a morpholino, piperidino or pyrrolidino residue, $R_2$ represents —$NHC_2$-$C_4$hydroxyalkyl, —$N(C_2$-$C_4$hydroxyalkyl)$_2$, —$N(C_1$-$C_4$alkyl)($C_2$-$C_4$hydroxyalkyl), or an amino acid or an amino acid amide residue from which a hydrogen has been removed from the amino group, each $R_3$, independently, represents hydrogen, $C_1$-$C_4$alkyl or $C_1$-$C_4$alkoxy and M represents hydrogen, an alkali metal atom, ammonium or a cation formed from an amine.

2. A composition according to claim 1, in which $R_2$ is an aliphatic amino acid or an amino acid amide residue of the formula $$-NR_4-CH(CO_2H)-R_4 \qquad (2)$$

or $$-NR_4-CH_2CH_2CONH_2 \qquad (3),$$

in which each $R_4$ and $R_4$, independently, represent hydrogen or a group having the formula -$CHR_5R_6$ in which $R_5$ and $R_6$, independently, are hydrogen or $C_1$-$C_4$alkyl optionally substituted by one or two substituents selected from the group consisting of hydroxy, thio, methylthio, amino, carboxy, sulfo, phenyl, 4-hydroxyphenyl, 3,5-diiodo-4-hydroxyphenyl, β-indolyl, β-imidazolyl and NH=C($NH_2$)NH—.

3. A composition according to claim 1, in which $R_2$ is derived from glycine, alanine, sarcosine, serine, cysteine, phenylalanine, tyrosine (4-hydroxyphenylalanine), diiodotyrosine, tryptophan (β-indolylalanine), histidine (β-imidazolylalanine), α-aminobutyric acid, methionine, valine (α-aminoisovaleric acid), norvaline, leucine (α-aminoisocaproic acid), isoleucine (α-amino-β-methylvaleric acid), norleucine (α-amino-n-caproic acid), arginine, ornithine (α,δ-diaminovaleric acid), lysine (α,ε-diaminocaproic acid), aspartic acid (aminosuccinic acid), glutamic acid (α-aminoglutaric acid), threonine, hydroxyglutamic acid, taurine, mixtures and optical isomers thereof, or from iminodiacetic acid or from N-(propionamido)-N-(2-hydroxyethyl)amine.

4. A composition according to claim 1 in which $R_2$ represent a mono-(2-hydroxyethyl)amino, a di-(2-hydroxyethyl)amino, a di-(2-hydroxypropyl)amino, an N-(2-hydroxyethyl)—N-methylamino, an aspartic acid or an iminodiacetic acid residue.

5. A composition according to claim 4 in which $R_2$ represents an aspartic acid, or an iminodiacetic acid residue.

6. A composition according to claim 1, in which M represents hydrogen, lithium, potassium, sodium, ammonium, mono-, di-, tri- or tetra-$C_1$-$C_4$alkylammonium, mono-, di- or tri-$C_1$—$C_4$hydroxyalkylammonium or ammonium that is di- or tri-substituted with a mixture of $C_1$-$C_4$alkyl and $C_1$-$C_4$hydroxyalkyl groups.

7. A composition according to claim 6, in which M represents hydrogen, potassium or sodium.

8. A process for the preparation of the compound mixture of formulae (1a), (1b) and (1c) of claim 1 which process comprises reacting, under known reaction conditions, cyanuric chloride, successively, in any desired sequence, with each of i) 4,4'-diaminostilbene-2,2'-disulphonic acid, ii) aniline or aniline substituted by $C_1$-$C_4$alkyl or $C_1$-$C_4$alkoxy, iii) an amino compound R$_1$H and
iv) an amino compound R$_2$H or, alternatively i) 4,4'-diaminostilbene-2,2'-disulphonic acid,
ii) aniline or aniline substituted by C$_1$-C$_4$alkyl or C$_1$-C$_4$alkoxy, and
iii) a mixture of an amino compound R$_1$H and an amino compound R$_2$H wherein R$_1$ and R$_2$ are different and R$_1$ represents —NH$_2$, —NHC$_1$-C$_4$alkyl, —N(C$_1$-C$_4$alkyl)$_2$, —NHC$_2$-C$_4$hydroxyalkyl, —N(C$_2$-C$_4$hydroxyalkyl)$_2$, —N(C$_1$-C$_4$alkyl)(C$_2$-C$_4$hydroxyalkyl), a morpholino, piperidino or pyrrolidino residue and R$_2$ represents —NHC$_2$-C$_4$hydroxyalkyl, —N(C$_2$-C$_4$hydroxyalkyl)$_2$, —N(C$_1$-C$_4$alkyl)(C$_2$-C$_4$ hydroxyalkyl), or an amino acid or an amino acid amide residue from which a hydrogen has been removed from the amino group.

9. A process according to claim 8, wherein cyanuric chloride is initially reacted with 4,4'-diaminostilbene-2,2'-disulphonic acid.

10. A process according to claim 9, wherein cyanuric chloride is initially reacted with 4,4'-diaminostilbene-2,2'-disulphonic acid, followed by reaction with aniline or aniline substituted by C$_1$—C$_4$alkyl or C$_1$-C$_4$alkoxy and then with a mixture of amino compounds R$_1$H and R$_2$H.

11. A compound of the formula

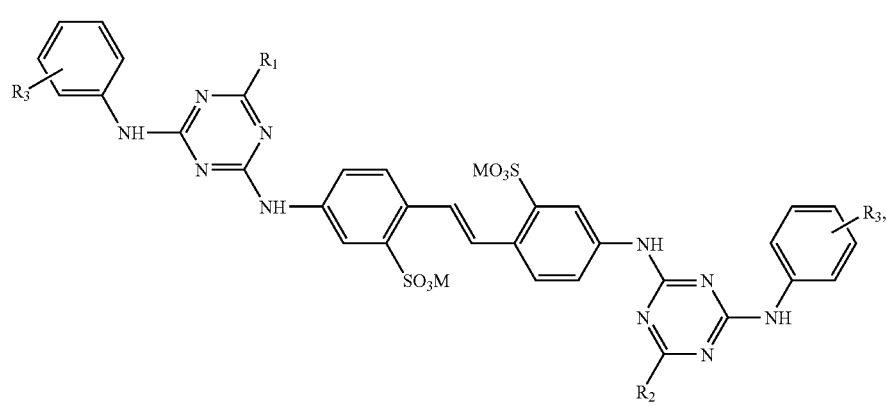

(1b)

in which

R$_1$ and R$_2$ are different and

R$_1$ represents —NH$_2$, —NHC$_1$-C$_4$alkyl, —N(C$_1$-C$_4$alkyl)$_2$, —NHC$_2$-C$_4$hydroxyalkyl, —N(C$_2$-C$_4$hydroxyalkyl)$_2$, —N(C$_1$-C$_4$alkyl)(C$_2$-C$_4$hydroxyalkyl), a morpholino, piperidino or pyrrolidino residue, R$_2$ represents an amino acid or an amino acid amide residue from which a hydrogen has been removed from the amino group, R$_3$ represents hydrogen, C$_1$-C$_4$alkyl or C$_1$-C$_4$alkoxy and M represents hydrogen, an alkali metal atom, ammonium or a cation formed from an amine.

12. A compound according to claim 11, in which R$_2$ is derived from glycine, alanine, sarcosine, serine, cysteine, phenylalanine, tyrosine (4-hydroxyphenylalanine), diiodotyrosine, tryptophan (β-indolylalanine), histidine (β-imidazolylalanine), α-aminobutyric acid, methionine, valine (α-aminoisovaleric acid), norvaline, leucine (α-aminoisocaproic acid), isoleucine (α-amino-β-methylvaleric acid), norleucine (α-amino-n-caproic acid), arginine, ornithine (α,δ-diaminovaleric acid), lysine (α,δ-diaminocaproic acid), aspartic acid (aminosuccinic acid), glutamic acid (α-aminoglutaric acid), threonine, hydroxyglutamic acid and taurine, as well as mixtures and optical isomers thereof, or from iminodiacetic acid or from N-(propionamido)-N-(2-hydroxyethyl)amine.

13. A composition according to claim 11 in which R$_2$ represents an aspartic acid, or an iminodiacetic acid residue.

14. A composition according to claim 11, in which M represents hydrogen, lithium, potassium, sodium, ammonium, mono-, di-, tri- or tetra-C$_1$-C$_4$alkylammonium, mono-, di- or tri-C$_1$—C$_4$hydroxyalkylammonium or ammonium that is di- or tri-substituted with a mixture of C$_1$-C$_4$alkyl and C$_1$-C$_4$hydroxyalkyl groups.

15. A composition according to claim 14, in which M represents hydrogen, potassium or sodium.

16. A composition for whitening synthetic or natural organic materials, which composition contains water, a fluorescent whitening agent comprising a mixture of the compounds (1a), (1b) and (1c), according to claim 1, and, optionally, one or more auxiliaries selected from the group consisting of dispersants, water retention aids, biocides and adjuvants.

17. A method for adding optical brightening agents to paper which method comprises the step of applying a composition of claim 16 either to a paper substrate in a pulp mass, to a paper substrate in a size-press, to a paper substrate in a metering press or contacting a paper surface with a coating application comprising a composition of claim 16.

18. A method, for increasing the Sun Protection Factor (SPF) rating or for the fluorescent whitening of a textile fibre material which method comprises the step of treating said textile fibre material with a composition of claim 16.

\* \* \* \* \*

UNITED STATES PATENT AND TRADEMARK OFFICE
CERTIFICATE OF CORRECTION

PATENT NO.        : 7,270,771 B2                                    Page 1 of 1
APPLICATION NO.   : 10/519031
DATED             : September 18, 2007
INVENTOR(S)       : Fabienne Cuesta et al.

It is certified that error appears in the above-identified patent and that said Letters Patent is hereby corrected as shown below:

<u>Title page,</u>

Item (22) should read:

(22) PCT Filed:   Jun. 26, 2003

Item (86) should read:

(86) PCT No.:   PCT/EP03/06789

§ 371 (c)(1),
(2), (4) Date:   Dec. 22, 2004

Signed and Sealed this

Eleventh Day of December, 2007

JON W. DUDAS
*Director of the United States Patent and Trademark Office*